Patented May 4, 1948

2,441,091

UNITED STATES PATENT OFFICE 2,441,091

METHOD OF PREPARING A 7-DEHYDROSTEROL

Jacob van der Vliet and Willem Stevens, Weesp, Netherlands, assignors, by mesne assignments, to Hartford National Bank and Trust Company, Hartford, Conn., as trustee No Drawing. Application February 15, 1946, Serial No. 648,019. In the Netherlands January 28, 1943

Section 1, Public Law 690, August 8, 1946
Patent expires January 28, 1963

26 Claims. (Cl. 260—397.2)

This invention relates to a method of synthetically preparing 7-dehydrosterols or derivatives thereof and more particularly to the synthetic preparation of 7-dehydrocholesterol which is of importance for the production of preparations having an antirachitic effect.

It is known to prepare a 7-dehydrosterol derivative synthetically by oxidation of a sterol ester to the 7-oxo compound, by reducing the latter to the 7-hydroxy compound, by esterification of the hydroxyl group in the 7-position, and finally by converting the produced ester into the 7-hydro compound by heating and splitting off the acid by means of which the esterification has taken place.

This method of preparation suffers from the drawback of being complicated, since it proceeds by way of many intermediate compounds and the yield of 7-dehydro compound is small with respect to the initial product.

Attempts have been made to obtain the desired product by a shorter way and to obtain a better yield, but these attempts did not lead to the desired result. Thus, for instance, it has been proposed to prepare 7-dehydrocholesterol via 7-aminocholesterol which by splitting off of ammonia should pass into the 7-dehydro compound (H. J. Eckhardt, Berichte, 1938, page 401).

Furthermore, attempts have been made to prepare 3,6-dihydroxy-7-bromocholestane by bromination of 6-oxo-cholestanylacetate with a view to working it further up into 7-dehydrocholesterol, but the bromination did not lead to the desired product (I. M. Heilbron, E. R. H. Jones and F. S. Spring, Journal of the Chemical Society, 1937, page 801).

It has now been found that a 7-dehydrosterol or a derivative thereof can be prepared in a simple manner and with a good yield by splitting off hydrohalogenic acid from a 7-halogenosterol (e. g., 7-chlorosterol or 7-bromosterol) or sterol derivative with the aid of agents for splitting off hydrohalogenic acid. Agents for splitting off hydrohalogenic acid are described in Houben, "Die Methoden der organischen Chemie," 3rd edition, II, page 947 et seq. A 7-halogenosterol or sterol derivative can be obtained by making a corresponding halogen compound act on a sterol or a derivative thereof, which halogen compound has a substituting effect on hydrogen linked to a carbon atom that is located adjacent a double carbon bond. Such a compound, particularly N-bromoacetamide falling into the category of the halogenamino compounds, is described in Houben, "Die Methoden der organischen Chemie," 3rd edition, III, page 1162. Further suitable compounds are, for instance, N-dibromoethylurethane; ethyl ester of N-bromoimino-carbonic acid; N-bromophthalimide; N-bromosuccinimide, which has been particularly recommended by Ziegler et al. (Liebig's Annalen, 551 (1942) 80) for the introduction of halogen into the so-called "allyl" position; N-bromoacetylurethane and so on.

In many cases it is not necessary to isolate the 7-halogeno compound, produced on halogenation, from the obtained reaction mixture. Thus, in preparing vitamin D3 by ultraviolet irradiation of 7-dehydrochloesterol obtained according to the invention, it is advantageous to irradiate the mixture by splitting off hydrohalogenic acid directly, without an intermediate purifying process, from the halogenation product.

According to a special embodiment of the invention, the splitting off of hydrohalogenic acid from the 7-halogenosterol is effected with the exclusion of oxygen. It has been found that in contradistinction to what might be anticipated in view of the relative stability to oxygen of 7-dehydrosterols in an alkaline medium, the exclusion of oxygen surprisingly gives a much greater yield of 7-dehydrosterol or sterol derivative than when oxygen is not excluded. The splitting off of hydrohalogenic acid may take place in an indifferent atmosphere, for instance a nitrogen atmosphere. Saponification, which sometimes follows the splitting off of hydrohalogenic acid, is preferably also effected with the exclusion of oxygen, for instance under nitrogen.

Furthermore, it has turned out that the choice of the agent for splitting off hydrohalogenic acid affects the yield of 7-dehydro product. As an agent for splitting off hydrohalogenic acid, use is preferably made of a tertiary amine such as quinoline, dimethylaniline, collidine and triethylamine, which give a much larger yield than, for instance, alcoholic caustic potash or sodium acetate dissolved in glacial acetic acid, which are also often used for splitting off hydrohalogenic acid.

The medium in which the hydrohalogenic acid is split off also affects the efficiency of the reaction. It is advisable not to use a solvent such as carbon tetrachloride or benzol, but to treat the product obtained by halogenation of the sterol or sterol derivative in a solvent-free medium with exclusively tertiary amine. The temperature at which the hydrohalogenic acid is split off may, for instance, amount to 80 to 140° C., the heating being continued of course until the halogen capable of being split off has been removed.

Furthermore, it has been found that in preparing a 7-dehydrosterol or sterol derivative by halogenation of a sterol derivative followed by splitting off hydrohalogenic acid, the choice of the derivative may importantly affect the results. Thus, for instance, it has been found that when working up esters—the use of which is desirable, since the ester group can split off again therefrom in a simple manner and with a small loss of sterol—use is made of sterol acetate or sterol stearate, particularly great yields of 7-dehydro product, calculated relatively to the output product, are obtained. The use of sterol formate or of the dioxalate affords the advantage that the content of 7-dehydrosterol in the sterol mixture obtained after splitting off hydrohalogenic acid is very high and may amount to about 60% by weight, i. e., about 60% of the sterols of the mixture that may, for instance, be isolated by means of digitonin consists of 7-dehydrosterol. In addition, the yield of 7-dehydro product, calculated relatively to the initial sterol derivative, is very satisfactory. Consequently, the use of these esters is of importance when a highly concentrated or pure product is to be prepared, for instance when 7-dehydrocholesterol is to be prepared for further activation into vitamin $D_3$ and the latter is to be isolated in a pure state. Furthermore, it is observed that a crystalline halogenation product is obtainable by causing a halogenation agent according to the invention to act on sterol benzoate or stearate, which may be of importance when, for instance for producing pure substances, the intermediate products in preparing 7-dehydrosterol have to be subjected to a purifying process.

The following executional examples illustrate the invention.

Example 1

5 grams of chloesterol acetate are treated in etheral solution with 80 mol % N-bromacetamide until the active bromine has been removed. Thereupon quinoline is added to the reaction mixture which is then heated to a temperature not in excess of 90° C., the ether distilling off, until the hydrobromic acid has been split off. The reaction mixture is diluted with peroxide-free ether, the quinoline is removed by washing with dilute acid, the ether is distilled off and the product obtained is purified by recrystallization. After saponification, 2,67 grams of sterol mixture were obtained having a content of 13.8% by weight of 7-dehydrocholesterol, determined spectrographically. Irradiation of the mixture yielded a preparation having a very strong antirachitic effect.

Example 2

1 millimol of cholesterol stearate is dissolved in 10 cc. of carbon tetrachloride and boiled with a quantity of N-bromosuccinimide containing 1 milli-equivalent of active bromine until all the active bromine has disappeared. After cooling and isolating the succinimide thus formed, the reaction mixture is carefully evaporated to dryness in vacuo, followed by heating on the steam-bath for 5 hours with 5 cc. of dimethylaniline under nitrogen, the liquid being then introduced into peroxide-free ether and washed with water and dilute acid so as to expel the dimethylaniline. After vaporization of the ether in vacuo, saponification takes place by heating for 20 minutes with alcoholic caustic potash under nitrogen on the steam-bath. The saponified mixture is poured into water and extracted by means of peroxide-free ether. The etheric solution is washed out with water and subsequently dried over sodium sulphate. After filtration, the digitonizable sterol in an aliquot part of the obtained solution is determined and the content of 7-dehydro product in the sterol digitonide is measured spectrographically. It amounts to 44% by weight. The remaining part of the etheric solution is evaporated to dryness in vacuo and recrystallized. The total yield of 7-dehydro product, calculated relatively to the cholesterol stearate used, is 33.6%.

When using collidine instead of dimethylaniline, the total yield of 7-dehydro product amounts to 36%. In this case, the content in the digitonizable sterol mixture amounts to 51% by weight. When the splitting off by hydrobromic acid by means of dimethylaniline is not effected under nitrogen but in the air, a total yield of 22.7% and a content of 32% by weight of 7-dehydrosterol in the digitonizable sterol mixture is obtained.

Example 3

Bromination of cholesterol benzoate with N-dibromoethylurethane followed by splitting off hydrobromic acid from the obtained product by heating with dimethylaniline under nitrogen, all this similarly to Example 2,—of course, however, the ethylurethane resulting from the bromination is not filtered off, since it is soluble in carbon tetrachloride—gave a total yield of 7-dehydro product of 17.3% and a content of 28% by weight in the digitonizable sterol mixture. When using cholesterol acetate, these figures amounted to 24 and 34.5% respectively.

Example 4

Bromination of cholesterol acetate with N-bromophthalimide followed by splitting off hydrobromic acid from the obtained product by heating with dimethylaniline under nitrogen, all of this similarly to Example 3, gave a total yield of 18.9% of 7-dehydro product and a content of 30% by weight in the digitonizable mixture.

Example 5

Bromination of cholesterol acetate with ethyl ester of N-bromoimino-carbonic acid and splitting off of hydrobromic acid with dimethylaniline gave a total yield of 19% of N-dehydro product and a content of 25% by weight in the digitonizable sterol mixture.

What is claimed is:

1. A process for the preparation of a 7-dehydrosterol, which comprises subjecting a 7-halogenosterol to the action of a dehydrohalogenating agent, whereby the elements of the corresponding hydrohalogenic acid are split off and a double bond is introduced in lieu thereof.

2. A process for the preparation of a 7-dehydrosterol, which comprises subjecting a 7-halogenosterol ester to the action of a dehydrohalogenating agent, whereby the elements of the corresponding hydrohalogenic acid are split off and a double bond is introduced in lieu thereof, and then converting the resultant 7-dehydrosterol ester into the 7-dehydrosterol by treating the same with a saponifying agent.

3. A process for the preparation of 7-dehydrocholesterol which comprises subjecting a 7-halogenocholesterol to the action of a dehydrohalogenating agent, whereby the elements of the corresponding hydrohalogenic acid are split off and a double bond is introduced in lieu thereof.

4. A process for the preparation of 7-dehydrocholesterol which comprises a subjecting a 7-halogenocholesteryl ester to the action of a dehydrohalogenating agent, whereby the elements of the corresponding hydrohalogenic acid are split off and a double bond is introduced in lieu thereof, and then converting the resultant 7-dehydrocholesteryl ester into 7-dehydrocholesterol by treating the same with a saponifying agent.

5. A process for the preparation of a 7-dehydrosterol, which comprises subjecting a 7-chlorosterol to the action of a dehydrohalogenating agent, whereby the elements of the corresponding hydrohalogenic acid are split off and a double bond is introduced in lieu thereof.

6. A process for the preparation of a 7-dehydrosterol, which comprises subjecting a 7-bromosterol to the action of a dehydrohalogenating agent, whereby the elements of the corresponding hydrohalogenic acid are split off and a double bond is introduced in lieu thereof.

7. A process for the preparation of a 7-dehydrosterol, which comprises subjecting a 7-halogenosterol to the action of a dehydrohalogenating agent, whereby the elements of the corresponding hydrohalogenic acid are split off and a double bond is introduced in lieu thereof, the reaction taking place with the exclusion of oxygen.

8. A process for the preparation of a 7-dehydrosterol, which comprises subjecting a 7-halogenosterol ester to the action of a dehydrohalogenating agent, whereby the elements of the corresponding hydrohalogenic acid are split off and a double bond is introduced in lieu thereof, the reaction taking place with exclusion of oxygen and then converting the resultant 7-dehydrosterol ester into the 7-dehydrosterol by treating the same with a saponifying agent.

9. A process for the preparation of a 7-dehydrosterol, which comprises subjecting a 7-halogenosterol ester to the action of a tertiary amine, whereby the elements of the corresponding hydrohalogenic acid are split off and a double bond is introduced in lieu thereof, and converting the resultant 7-dehydrosterol ester into the 7-dehydrosterol by heating the same with a saponifying agent.

10. A process for the preparation of 7-dehydrocholesterol, which comprises subjecting a 7-halogenocholesterol ester to the action of a tertiary amine, whereby the elements of the corresponding hydrohalogenic acid are split off and a double bond is introduced in lieu thereof, and converting the resultant 7-dehydrosterol ester into the 7-dehydrosterol by heating the same with a saponifying agent.

11. A process for the preparation of a 7-dehydrosterol, which comprises treating a $\Delta^{5,6}$-sterol ester with a halogen compound capable of replacing hydrogen which is linked to a carbon atom adjacent a carbon-to-carbon double bond whereby a 7-halogenosterol ester is produced, subjecting the latter to the action of a dehydrohalogenating agent, whereby the elements of the corresponding hydrohalogenic acid are split off and a double bond is introduced in lieu thereof, and converting the resultant 7-dehydrosterol ester into the 7-dehydrosterol by heating the same with a saponifying agent.

12. A process for the preparation of 7-dehydrocholesterol, which comprises treating cholesterol ester with a halogen compound capable of replacing hydrogen which is linked to a carbon atom adjacent a carbon-to-carbon double bond whereby a 7-halogenocholesterol ester is produced, subjecting the latter to the action of a dehydrohalogenating agent, whereby the elements of the corresponding hydrohalogenic acid are split off and a double bond is introduced in lieu thereof, and converting the resultant 7-dehydrosterol ester into the 7-dehydrosterol by heating the same with a saponifying agent.

13. A process for the preparation of a 7-dehydrosterol, which comprises treating a $\Delta^{5,6}$-sterol ester with N-halogenoacid amide whereby a 7-halogenosterol ester is produced, subjecting the latter to the action of a dehydrohalogenating agent, whereby the elements of the corresponding hydrohalogenic acid are split off and a double bond is introduced in lieu thereof, and converting the resultant 7-dehydrosterol ester into the 7-dehydrosterol by heating the same with a saponifying agent.

14. A process for the preparation of 7-dehydrocholesterol, which comprises treating cholesterol ester with N-halogenoacid amide whereby a 7-halogenocholesterol ester is produced, and then subjecting the latter to the action of a dehydrohalogenating agent, whereby the elements of the corresponding hydrohalogenic acid are split off and a double bond is introduced in lieu thereof, and converting the resultant 7-dehydrosterol ester into the 7-dehydrosterol by heating the same with a saponifying agent.

15. A process for the preparation of a 7-dehydrosterol, which comprises treating a $\Delta^{5,6}$-sterol acetate with a halogen compound capable of replacing hydrogen which is linked to a carbon atom adjacent to a carbon-to-carbon double bond whereby a 7-halogenosterol acetate is produced, subjecting the latter to the action of a dehydrohalogenating agent whereby the elements of the corresponding hydrohalogenic acid are split off and a double bond is introduced in lieu thereof, and then converting the resultant 7-dehydrosterol acetate into the 7-dehydrosterol by treating the same with a saponifying agent.

16. A process for the preparation of a 7-dehydrosterol, which comprises treating a $\Delta^{5,6}$-sterol stearate with a halogen compound capable of replacing hydrogen which is linked to a carbon atom adjacent a carbon-to-carbon double bond whereby a 7-halogenosterol stearate is produced, subjecting the latter to the action of a dehydrohalogenating agent whereby the elements of the corresponding hydrohalogenic acid are split off and a double bond is introduced in lieu thereof, and then converting the resultant 7-dehydrosterol stearate into the 7-dehydrosterol by treating the same with a saponifying agent.

17. A process for the preparation of 7-dehydrocholesterol, which comprises treating cholesteryl acetate with a halogen compound capable of replacing hydrogen which is linked to a carbon atom adjacent a carbon-to-carbon double bond whereby a 7-halogencholesteryl acetate is produced, subjecting the latter to the action of a dehydrohalogenating agent whereby the elements of the corresponding dehydrohalogenic acid are split off and a double bond is introduced in lieu thereof, and then converting the resultant 7-dehydrocholesteryl acetate into 7-dehydrocholesterol by treating the same with a saponifying agent.

18. A process for the preparation of 7-dehydrocholesterol, which comprises treating cholesteryl stearate with a halogen compound capable of replacing hydrogen which is linked to a carbon atom adjacent a carbon-to-carbon double bond whereby a 7-halogencholesteryl stearate is produced, subjecting the latter to the action of a dehydrohalogenating agent whereby the elements of the corresponding hydrohalogenic acid are split off and a double bond is introduced in lieu thereof, and then converting the resultant 7-dehydrocholesteryl stearate into 7-dehydrocholesterol by treating the same with a saponifying agent.

19. In a process of the character described, the step of subjecting a member of the group consisting of 7-halogenosterols and esters thereof to the action of a dehydrohalogenating agent, whereby the elements of the corresponding hydrohalogenic acid are split off and a double bond is introduced in lieu thereof.

20. A process according to claim 11, wherein the dehydrohalogenating agent is a tertiary amine.

21. In a process of the character described, the steps of subjecting a member of the group consisting of $\Delta^{5,6}$-unsaturated sterols and their esters to the action of a halogen compound capable of replacing hydrogen which is linked to a carbon-to-carbon double bond whereby 7-halogenosterols and 7-halogenosterolesters are formed, and subjecting these 7-halogenosterols and 7-halogenosterolesters to the action of a dehydrohalogenating agent whereby the elements of the corresponding hydrohalogenic acid are split off and a double bond is introduced in lieu thereof.

22. A process according to claim 21, wherein the halogenating agent is an N-halogenated acid amide.

23. A process according to claim 21, wherein the halogenating agent is an N-halogenated acid imide.

24. A process according to claim 21, wherein the halogenating agent is N-bromosuccinimide.

25. In a process of the character described, the steps of subjecting a member of the group consisting of $\Delta^{5,6}$-unsaturated sterols and their esters to the action of a halogen compound capable of replacing hydrogen which is linked to a carbon-to-carbon double bond whereby 7-halogenosterols and 7-halogenosterolesters are formed, and subjecting these 7-halogenosterols and 7-halogenosterolesters without intermediate purification to the action of a dehydrohalogenating agent whereby the elements of the corresponding hydrohalogenic acid are split off and a double bond is introduced in lieu thereof.

26. In a process of the character described, the steps of subjecting a carboxylic acid ester of cholesterol to the action of a halogen compound selected from the group consisting of N-halogenoimides of carboxylic acid capable of replacing hydrogen which is linked to a carbon-to-carbon double bond whereby a 7-halogenosterol reaction product is formed, subjecting the 7-halogenosterol reaction product without intermediate purification to the action of a tertiary amine whereby the elements of the corresponding hydrohalogenic acid are split off and a double bond is introduced in lieu thereof, and treating the resultant 7-dehydrocholesterolester with a saponifying agent to convert the 7-dehydrocholesterolester to a 7-dehydrocholesterol.

JACOB van der VLIET.
WILLEM STEVENS.

REFERENCES CITED

The following references are of record in the file of this patent:

UNITED STATES PATENTS

| Number | Name | Date |
|---|---|---|
| 2,299,759 | Marker | Oct. 27, 1942 |
| 2,369,065 | Marker | Feb. 6, 1945 |

FOREIGN PATENTS

| Number | Country | Date |
|---|---|---|
| 574,432 | Great Britain | Jan. 4, 1946 |

OTHER REFERENCES

Ziegler, Annalen, 551, 80 (1942).